(12) United States Patent
Schmit et al.

(10) Patent No.: US 8,072,610 B1
(45) Date of Patent: Dec. 6, 2011

(54) POLARIZATION MIRAU INTERFERENCE MICROSCOPE

(75) Inventors: Joanna Schmit, Tucson, AZ (US); Parameswaran Hariharan, Wayne, PA (US)

(73) Assignee: Bruker Nano, Inc., Santa Barbara, CA (US)

( * ) Notice: Subject to any disclaimer, the term of this patent is extended or adjusted under 35 U.S.C. 154(b) by 690 days.

(21) Appl. No.: 12/217,015

(22) Filed: Jul. 1, 2008

(51) Int. Cl.
*G01B 9/02* (2006.01)
(52) U.S. Cl. .................................................. 356/495
(58) Field of Classification Search .................. 356/491, 356/492, 495
See application file for complete search history.

(56) References Cited

U.S. PATENT DOCUMENTS 4,948,253 A * 8/1990 Biegen .......................... 356/495

OTHER PUBLICATIONS

Daniel Malacara, "Optical Shop Testing", 2007, John Wiley and Sons Inc. Third Edition, p. 735-741.*
Grant Fowles, "Introduction to Modern Optics", 1975, Dover Publications, Second Edition, p. 32-33.*

* cited by examiner

*Primary Examiner* — Tarifur Chowdhury
*Assistant Examiner* — Jonathan Hansen
(74) *Attorney, Agent, or Firm* — Antonio R. Durando (57) ABSTRACT

The conventional two plates with beamsplitter of the Mirau interferometer are replaced with two achromatic λ/4 retarders. The upper surface of the second retarder is coated with a 50 percent reflecting film, so that it also functions as a beamsplitter. The objective is illuminated with a linearly polarized beam. As a result of this arrangement, the test and reference beam emerging from the Mirau interferometer are orthogonally polarized beams suitable for achromatic phase shifting, thereby facilitating the use of the Mirau interferometer for monochromatic to broadband phase-shifting interference microscopy. Alternatively, it can be used for equalization of beams intensity by placing a rotatable polarizer at the exit of the objective.

19 Claims, 13 Drawing Sheets

POLARIZATION MIRAU INTERFERENCE MICROSCOPE

BACKGROUND OF THE INVENTION

1. Field of the Invention

The invention relates in general to Mirau interferometry for optical testing and, in particular, to a modified Mirau interferometer producing orthogonally polarized beams suitable for achromatic phase-shifting interference microscopy.

2. Description of the Prior Art

Figure 1A:
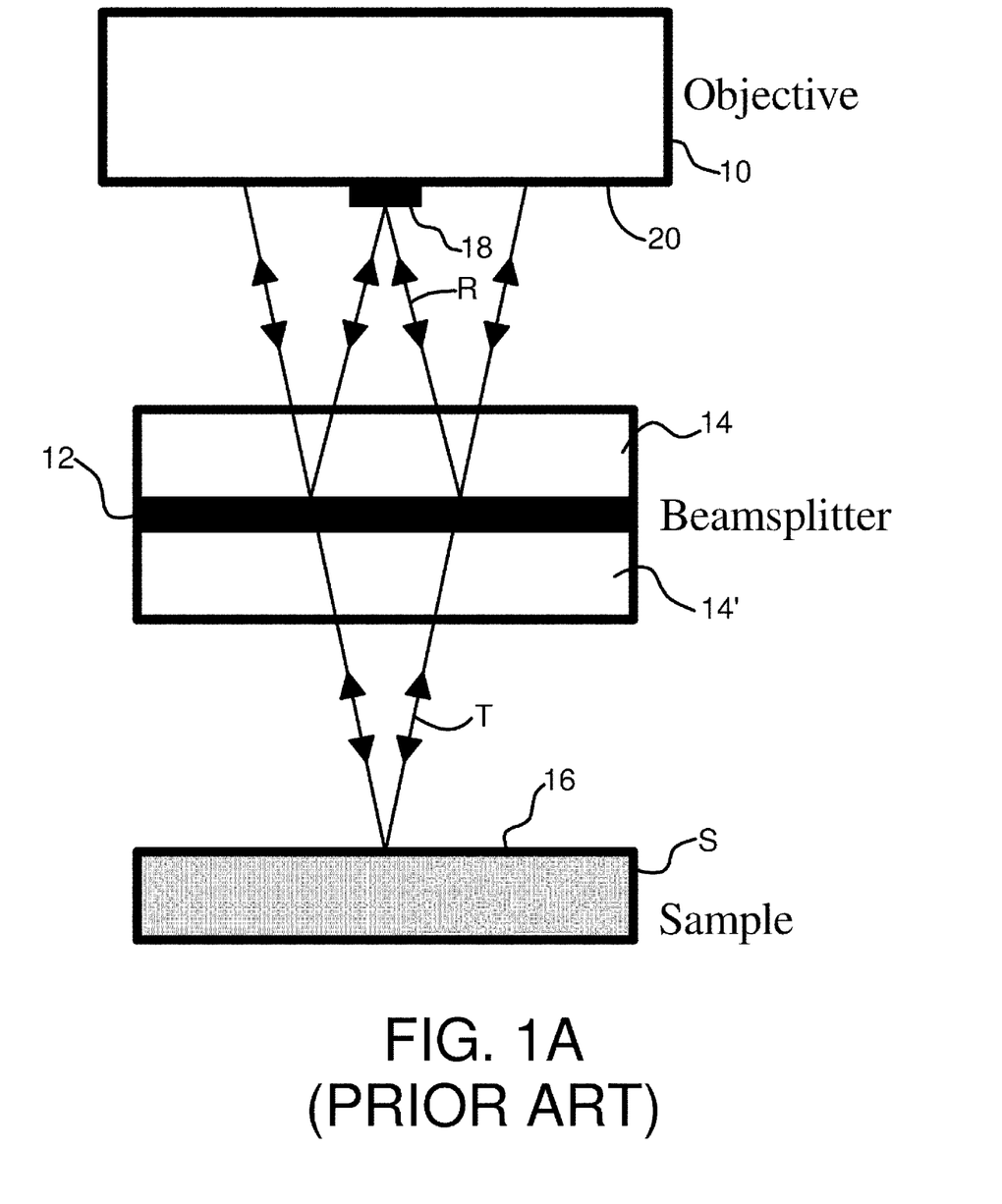
FIG. 1A is a schematic representation of a conventional Mirau interferometer, as used for testing sample surfaces.

Because of its simple configuration and corresponding relative ease of calibration, the Mirau interference objective is used widely to study the structure of surfaces requiring observation at higher magnification, typically 10× to 75×. It features a very compact interferometer incorporated in a single microscope objective, as illustrated schematically in FIG. 1. Light from an illuminator (not shown) is passed through a microscope objective 10 onto a beamsplitter consisting of a beamsplitting coating 12 between two identical transmissive plates 14 and 14'. The transmitted beam T proceeds to the test surface 16 of a sample object S, while the reflected beam R is directed to the reference surface 18, typically an aluminized spot on the front surface 20 of the microscope objective 10. The two beams T and R reflected from the test and reference surfaces, respectively, are recombined at the beamsplitter 12 and return through the objective 10 toward a detector element (not shown).

Figure 1B:
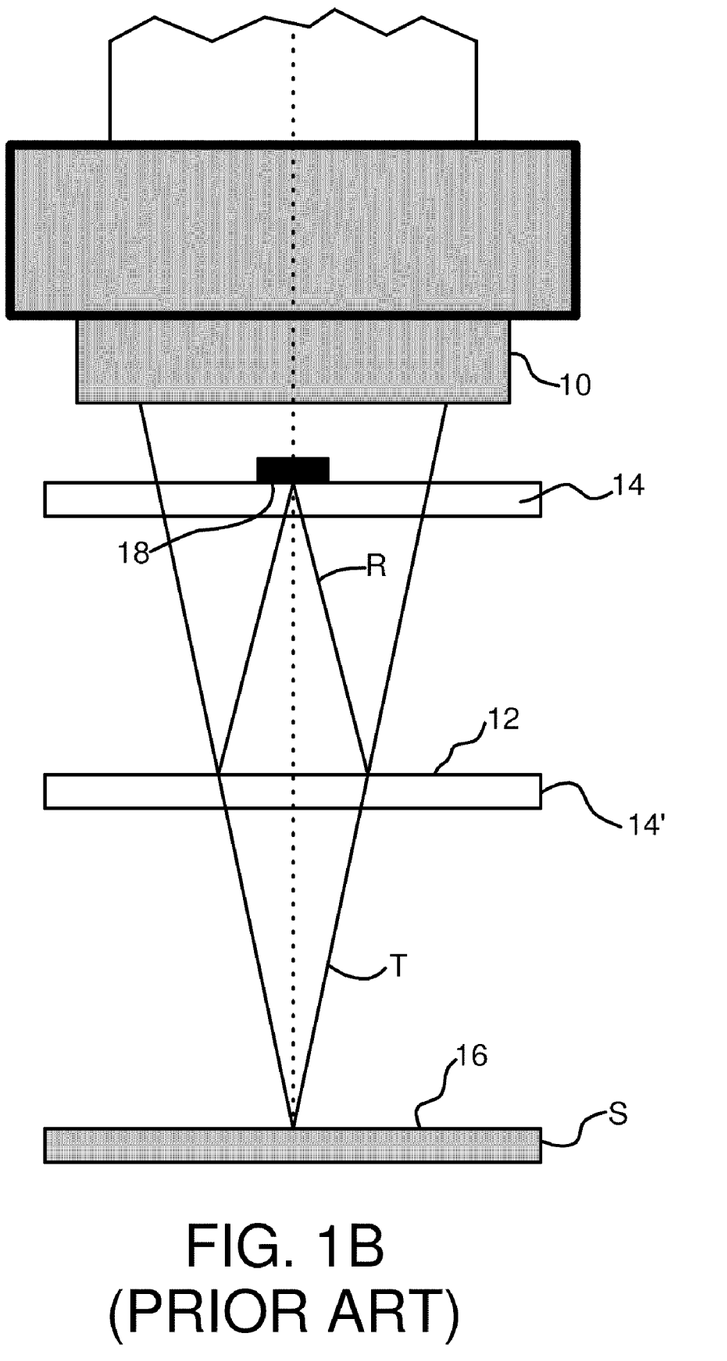
FIG. 1B is a schematic representation of an alternative configuration of Mirau interferometer.

In an alternative Mirau embodiment, shown in FIG. 1B, the two plates 14,14' are separated and the top plate 14 is positioned away from the coated beamsplitting plate 14' in contact with the reference surface 18. As one skilled in the art would readily appreciate, the optical effect is the same because in both configurations the test and reference beams (T and R, respectively) traverse the same optical distance (due to the fact that the plates 14 and 14' are identical).

The interference pattern formed in the image plane contours the deviations from flatness of the test surface 16. As is well understood in the art, if the beamsplitter in the Mirau interferometer (or the whole microscope objective incorporating the beamsplitter, or the object, or the reference mirror) is mounted on a piezoelectric translator (PZT), so that the optical path difference (OPD) can be changed by known amounts, very accurate measurements of surface profiles can be made using phase-shifting techniques. Mirau interferometers also provide inherent compensation for chromatic dispersion because the beamsplitting element 12 is contained within the two identical plates 14,14'. Thus, each beam (T and R) traverses the exact same optical length twice in each direction upon impinging on the beamsplitter, thereby negating any dispersive effects of the plates medium.

Figure 2:
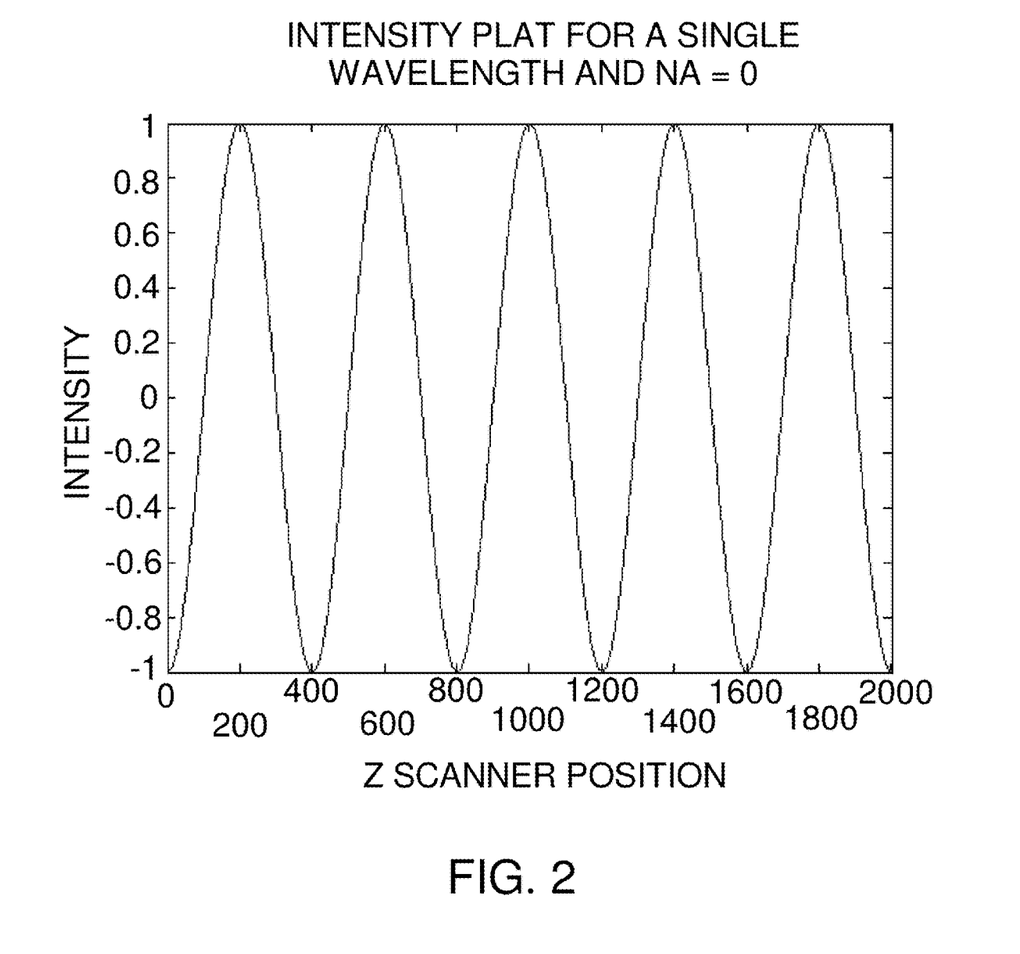
FIG. 2 illustrates the plot of intensity versus scanning height registered at a pixel of an interferometer's detector when a single-wavelength light source is used to illuminate the sample with zero numerical aperture and no environmental perturbations (such as variable scanning steps, vibrations, and air turbulence).
Figure 3:
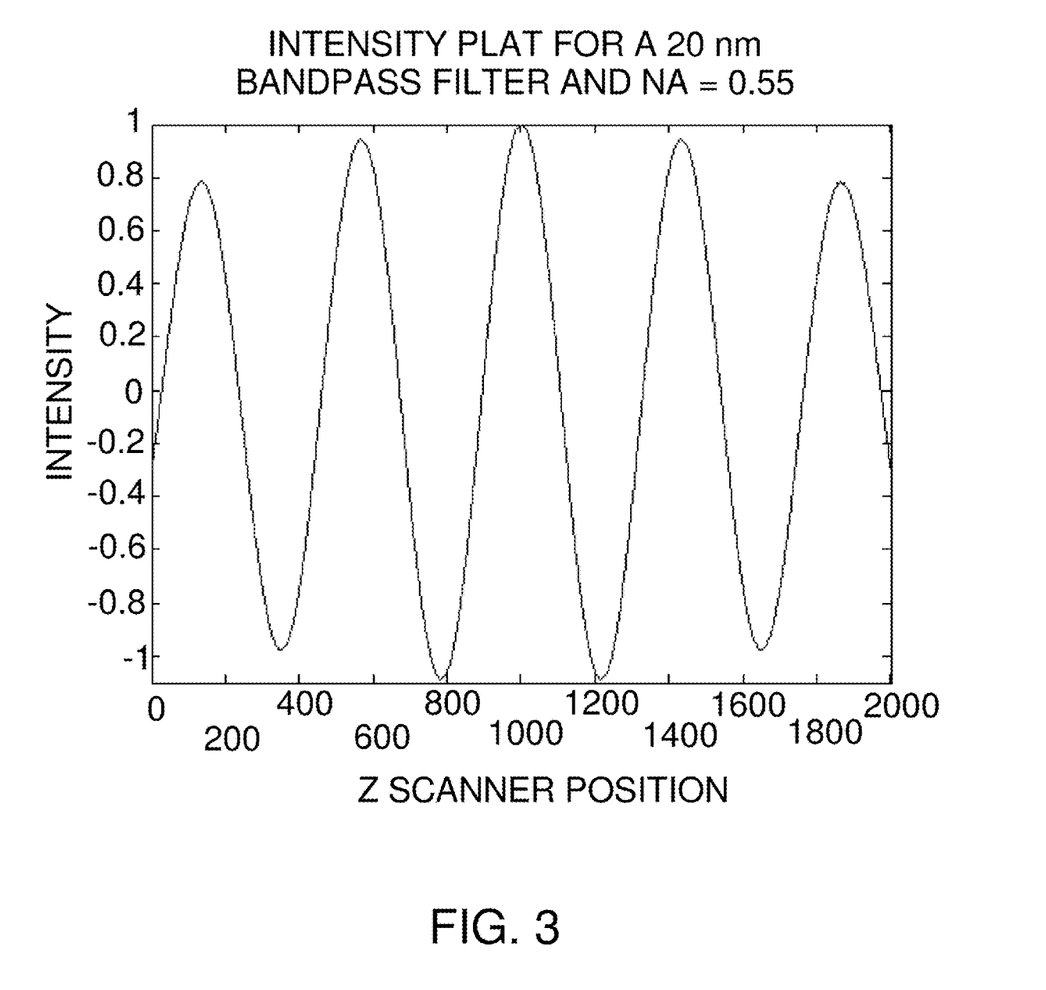
FIG. 3 shows the modulation effect produced by a narrow-band light source and non-zero numerical aperture on the intensity plot of FIG. 2A.

However, the performance of Mirau interferometers (as well as all other scanning interferometers) is affected by the fact that the algorithms used in optical scanning interferometry assume that the amplitude of interference signal modulation remains constant during the scan. In fact, that is almost never the case. In practice, the light intensity detected as a result of interference of the test and reference beams, which would be perfectly sinusoidal under ideal single-wavelength and zero-numerical-aperture conditions, as shown in FIG. 2, exhibits a modulation variation that affects the interferometric result even when narrow-band light is used (or non zero numerical aperture or both), as illustrated in FIG. 3.

Furthermore, it is well known that the use of monochromatic light is accompanied by the so-called $2\pi$ phase ambiguities that arise when the measurement range involves a change in the optical path difference (OPD) greater than a wavelength. Phase unwrapping techniques are used in the art, but they are effective only with smooth continuous surfaces and break down when the test surface exhibits a sharp step or a discontinuity.

One way of overcoming the $2\pi$-ambiguity problem is by using white light and scanning the object along the height (z) axis. The position along the z axis yielding maximum visibility of the fringes (the coherence peak) for each pixel in the image is known to correspond to the height of the object at that point. The visibility peak can be located by shifting the phase of the reference wave by three or more known amounts at each step along the z axis and recording the corresponding values of intensity. These intensity values can then be used in conventional algorithms to evaluate the fringe visibility at that step. However, if the phase shifts are introduced by changes in the OPD, as is the case in conventional scanning interferometry, the value of the resulting phase shift varies inversely with the wavelength, thereby producing fringes with varying modulation, as shown in FIG. 3, and the calculated phase and modulation may contain errors.

This problem may be overcome by using a different technique of phase shifting involving a cycle of changes in the polarization of the light to produce the same phase shift, measured in degrees or radians, for all wavelengths. This phase shift, known in the art as the Pancharatnam phase shift (see S. Pancharatnam, "Achromatic combinations of birefringent plates," Proc. Indian Acad. Sci., A 41, 137-144, 1955), is a manifestation of the geometric phase and it can be used to generate any required wavelength-independent phase shift without changing the optical path difference. As a result, geometric phase-shifting has found many applications in interferometry.

Figure 4:
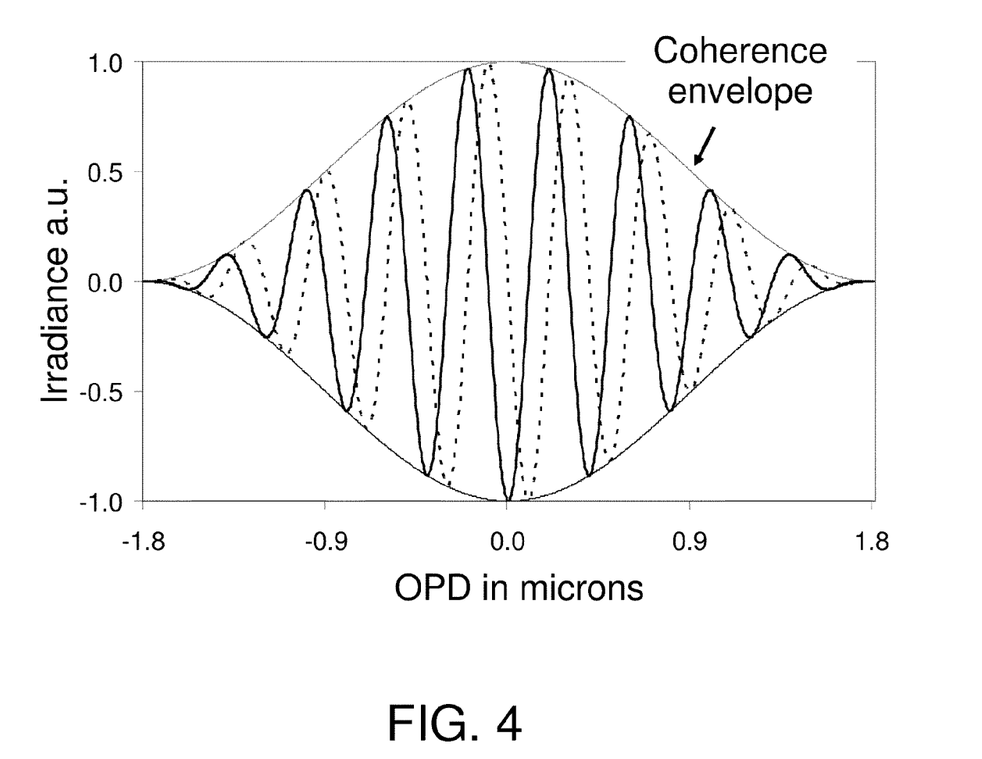
FIG. 4 illustrates the shift in interference fringes produced by a geometric phase shift while the coherence envelope remains unchanged.

In white-light interference, a change in the geometric phase produces a shift in the fringes under the coherence envelope, but the coherence envelope stays in place, as illustrated in FIG. 4, resulting in no change in the fringe contrast at each point. In comparison, the whole white-light interferogram is shifted during scanning phase shifting, resulting in changing fringe contrast at each point. Thus, for multi-wavelength interferometry a geometric phase-shifter is preferred because it will produce the same phase shifts for any wavelength used in the interferometer.

Figure 5A:
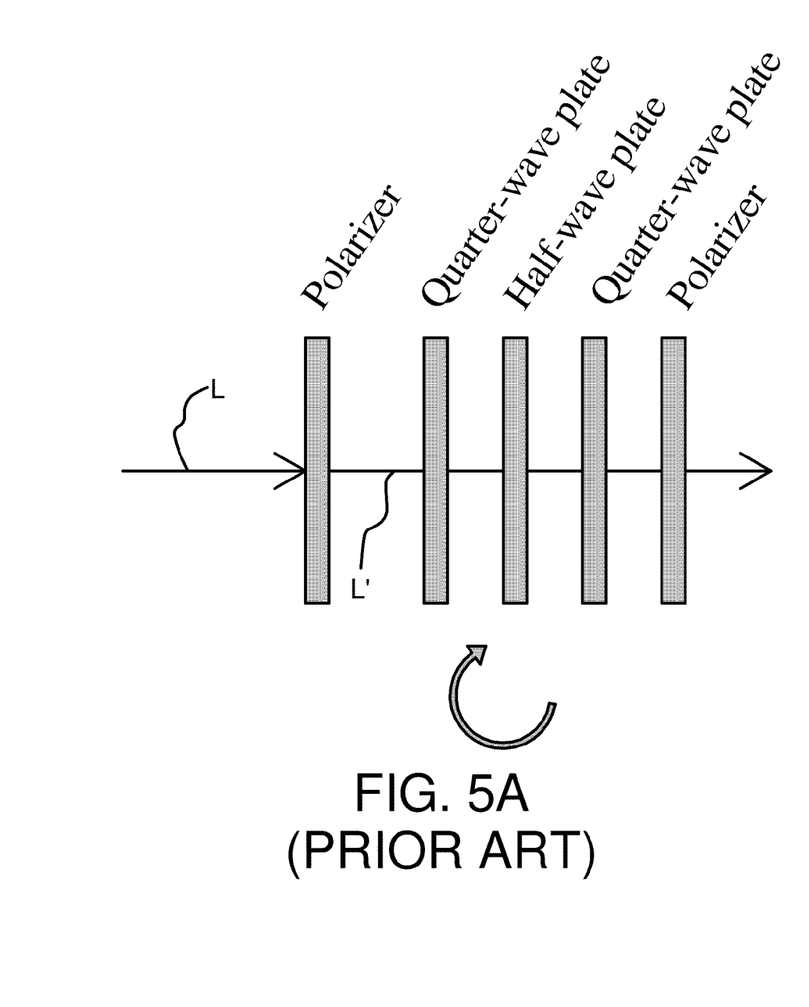
FIGS. 5A and 5B illustrate two types of achromatic phase-shifters.
Figure 5B:
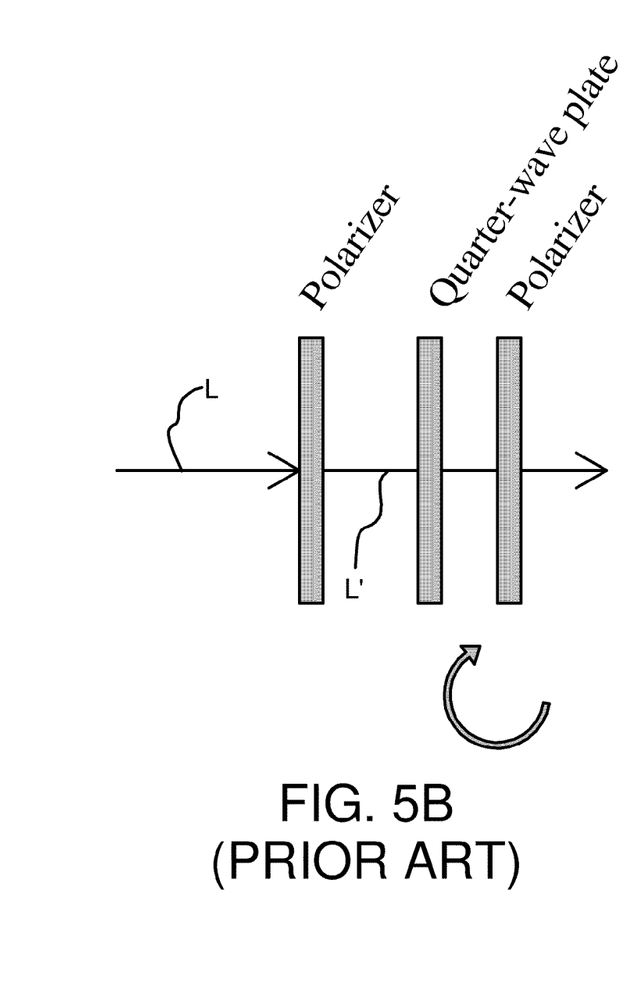

Achromatic phase-shifters operating on geometric phase have been developed in the art using circularly polarized light, as illustrated in FIGS. 5A and 5B, for example. Linearly polarized light can be achieved by placing first a polarizer in the path of a beam, then passing the light through a quarter-wave plate that makes it circularly polarized, and then through a rotating half-wave plate followed by a quarter-wave plate and another polarizer (FIG. 5A). In a simpler arrangement, the last three elements are substituted by a single rotating polarizer (FIG. 5B). In all cases, in order to introduce a phase shift between two interfering beams, the two beams exiting the interferometer need to be orthogonally polarized (note that then the first polarizer shown in FIG. 5A is not needed).

Figure 6:
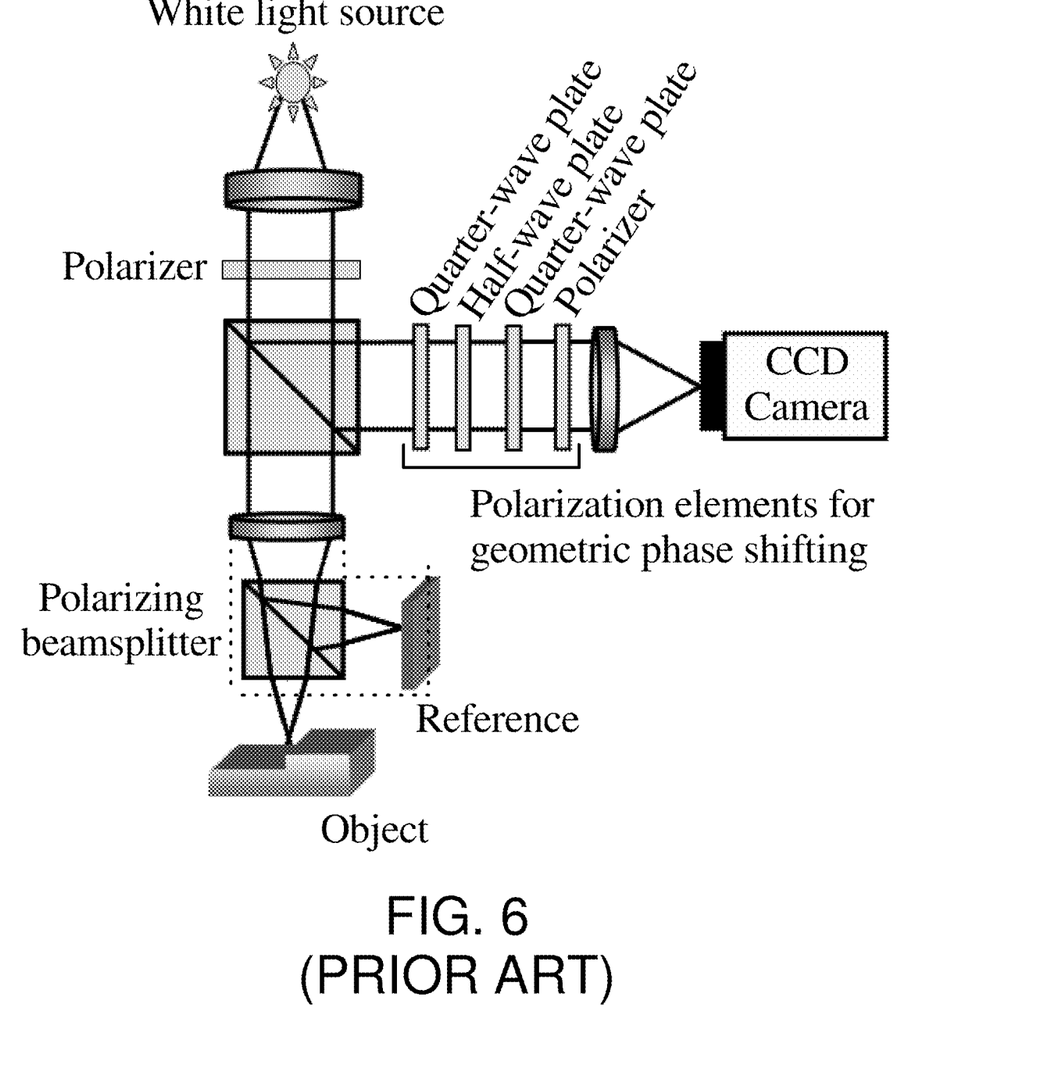
FIG. 6 illustrates a geometric phase-shifter coupled to a Michelson interferometer.

Based on these principles, FIG. 6 illustrates a Michelson interferometer adapted for geometric phase shifting operation by producing two orthogonally linearly polarized beams at the output of the reference and object arms of the interferometer. A geometric phase-shifter consisting of a rotating half-wave plate mounted between two quarter-wave plates with their axes set at 45° to the angles of polarization of the two beams, is placed at the exit of the interferometer. This interferometer employs the type of geometric phase-shifter shown in FIG. 5A in which the first quarter-wave plate creates left- and right-handed circularly polarized beams. The half-wave plate then changes the right-handed circularly polarized beam to a left-handed one and the left-handed circularly polarized beam to a right-handed one. Finally, the second quarter-wave plate brings the two beams back to their original orthogonal linear polarizations.

As a result of this configuration, a rotation a of the half-wave plate shifts the phase of one linearly polarized beam by $+2\alpha$ and the phase of the other orthogonally polarized beam by $-2\alpha$, so that a net phase difference of $4\alpha$ is introduced between the two beams. This phase difference is very nearly independent of the wavelength over the whole visible spectrum. The polarizer makes it possible for the two beams to interfere.

Another type of geometric phase-shifter utilizes the configuration of FIG. 5B, wherein a rotating polarizer is placed after the quarter-wave plate that changed the two orthogonally polarized beams leaving the interferometer to left- and right-circularly polarized beams. In this case, if the test beam is left-circularly polarized and the reference beam is right-circularly polarized and both beams are incident upon the linear polarizer set at an angle $\alpha$ with respect to the x-axis, both the test and reference beams, upon passing through the polarizer, become linearly polarized at an angle $\alpha$. However, a phase offset $+\alpha$ is added to the test beam and a phase offset $-\alpha$ is added to the reference beam. A rotation of the linear polarizer by $\alpha$ therefore introduces a phase shift $2\alpha$ between the two interfering beams. The linear polarizer acts as a phase shifting device and also makes it possible for these beams to interfere. While an achromatic quarter-wave plate could be used to extend the spectral range over which this phase-shifter operates, it turns out that the variations in the phase shift produced by this system due to variations in the retardation of the quarter-wave plate with the wavelength are quite small. (See S. S. Helen, M. P. Kothiyal and R. S. Sirohi, "Achromatic Phase-shifting using a Rotating Polarizer," Opt. Commun., 154, 249-254, 1998).

Figure 7:
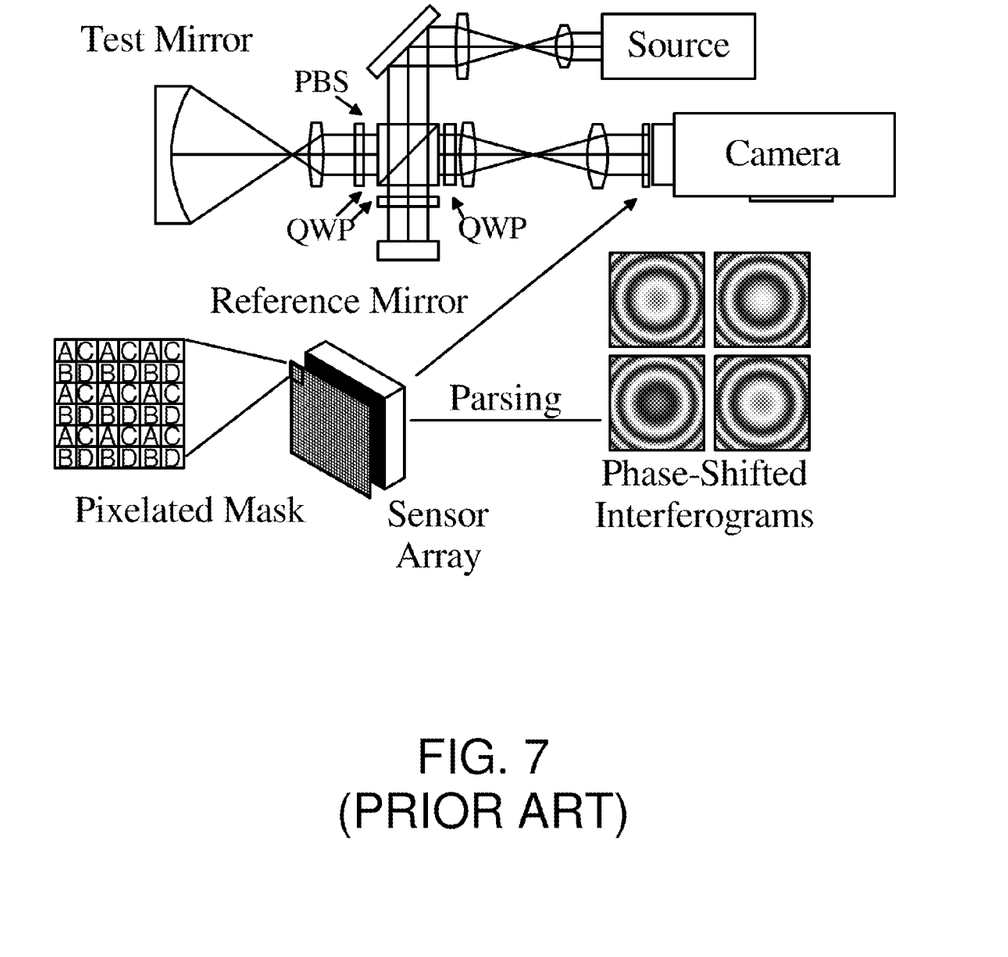
FIG. 7 illustrates a pixelated-mask implementation of a geometric phase-shifter in a Fizeau interferometer.

Because the measurement time can be critical in some industrial applications, it can be reduced significantly if the interferograms are collected simultaneously. This can be done using yet another form of geometric phase-shifting, a pixelated mask, as disclosed in U.S. Pat. No. 7,230,717 (Millerd et al.). As illustrated in FIG. 7, a polarizing beamsplitter is used to produce reference and test beams with orthogonal polarizations. Quarter-wave plates are placed in the reference and test beams so that each beam initially transmitted through the beamsplitter is reflected when it returns, and vice versa. These two beams pass through a quarter-wave plate, which converts the two orthogonally polarized beams to right- and left-handed circularly polarized beams, and then through a phase mask. The quarter-wave plate can be placed at the exit of the interferometer, or in front of the camera, while the phase mask is placed just in front of the CCD array in the camera.

The phase mask is a micropolarizer array built up of groups of four linear polarizer elements having their transmission axes at 0, 45, 90, and −45 degrees (or at 0, 45, −45 and 90 degrees) and is structured so that each polarizer element is placed over a detector element. These four linear polarizer elements introduce phase shifts between the test and reference beams of 0, 90, 180, and 270 degrees. Thus, four phase-shifted interferograms, obtained from each group of pixels, are recorded simultaneously using a single CCD array. As one skilled in the art would easily recognize, the phase mask works as a geometric phase-shifter, the two essential requirements being that the test and reference beams traveling through the quarter wave plate have orthogonal polarizations and that the micropolarizer array match the CCD array.

The solutions described above for effecting geometric phase shifts have been used successfully to overcome the multiple-wavelength and numerical aperture problems discussed above in various interferometer configurations, but no comparable solution has yet been found for Mirau interferometers. In order to use a phase shifter operating on the geometric (Pancharatnam) phase, the Mirau test and reference beams T and R emerging from the interferometer need to be linearly polarized in orthogonal planes. However, because of the compactness of the Mirau interferometric objective and the coaxial configuration of the test and reference arms, very little space is available for introducing additional optical elements and a workable solution has not been found to date in spite of the frequent commercial use of Mirau configurations for optical scanners. The present invention is directed at a viable solution for this problem.

SUMMARY OF THE INVENTION

The invention lies in the idea of replacing the conventional double-plate beamsplitter of the Mirau interferometer with two achromatic $\lambda/4$ retarders. A single retarder may suffice, as detailed below, but two are preferred for optimal performance. The upper surface of the second retarder is coated with a 50 percent reflecting film, so that it also functions as a beamsplitter. The objective is illuminated with a linearly polarized beam in the vertical plane (azimuth 0°) and the first retarder is set with its principal axis parallel to the plane of polarization of the incident beam (azimuth 0°), while the second retarder is set with its principal axis at an angle of 45° to the plane of polarization of the incident beam (azimuth 45°). As mentioned above, note that to the extent quarter-wave retarders have two principal axes, either can be placed as described, the effect on the final output being the same. The same comment applies throughout this disclosure.

As a result of this arrangement, the beam reflected back from the beam-splitting film (the reference beam), which only traverses the first retarder, emerges with its polarization unchanged. However, the beam transmitted by the beamsplitting film (the test beam), which traverses the second retarder twice, emerges with its plane of polarization rotated by 90°. The two retarders are preferably cut from a single achromatic $\lambda/4$ plate, so that both beams traverse exactly the same thicknesses of the birefringent materials used for the $\lambda/4$ plates and dispersion effects are cancelled. The output of the Mirau interferometer thus consists of two orthogonally polarized beams that can be used advantageously for geometric phase-shift interferometry.

Other objects, features and advantages of the invention will become apparent to those skilled in the art from a consideration of the following detailed description taken in conjunction with the accompanying drawings and claims.

DESCRIPTION OF THE PREFERRED EMBODIMENT

Figure 8:
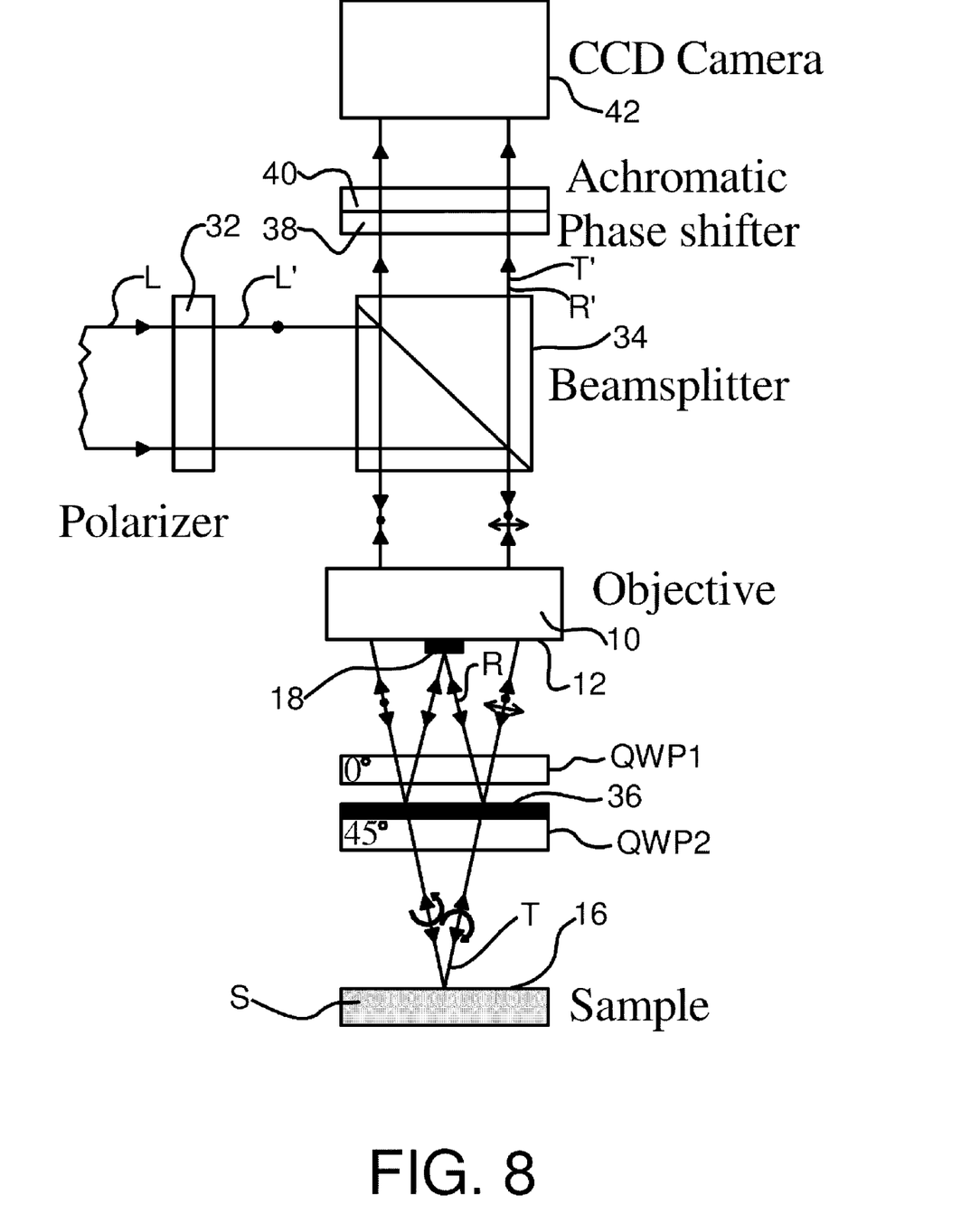
FIG. 8 illustrates a polarization Mirau interferometer according to the invention.

Referring to FIG. 8, wherein like parts are designated with the same numerals and symbols used throughout the drawings, a Mirau interferometric objective 30 according to the preferred embodiment of the invention is illustrated in schematic form. A light source (not shown), such as white light or any illumination of predetermined bandwidth, directs a beam of light L through a polarizer 32 toward a beam splitter 34 that reflects the light in the direction of the test surface 16. The light reflected by the beam splitter 34 passes through the microscope objective 10 focused on the test surface.

For the purposes of this disclosure and the appended claims, a predetermined bandwidth is intended to also include a single wavelength. According to the invention, the Mirau interferometer 30 includes two achromatic quarter-wave plate retarders, QWP1 and QWP2. With a proper choice of materials, variations in the retardation produced by the quarter-wave plates QWP1 and QWP2 over the range of bandwidth within white-light wavelengths (from about 400 nm to about 700 nm) can be held to less than +/−4.5 degrees. Moreover, to ensure that they have the same optical thickness, these two retarders are preferably cut from a single achromatic $\lambda/4$ plate. As a result of using two retarders cut from the same plate, the dispersion effects are minimized at all numerical apertures. For this reason this configuration is preferred, even though a single quarter-wave plate QWP2 could be used with a transmissive plate of the same thickness to practice the invention (especially at low numerical apertures and very narrow-band light, when the dispersion effects are less significant). If retarders cut from different plates are used, the important factor is that they have matching dispersive characteristics at the bandwidth of illumination. The upper surface of the lower quarter-wave plate (QWP2) is coated with a 50 percent reflecting film 36, so that it also functions as a beamsplitter.

The objective 10 is illuminated with a linearly polarized beam L' polarized, for example, in the vertical plane (azimuth 0°) by the polarizer 32. The upper quarter-wave plate QWP1 is then set with one of its principal axes (the end effect being the same, as well understood in the art) parallel to the plane of polarization of the incident beam L (azimuth 0° or 90°), while the second quarter-wave plate QWP2 is set with one of its principle axes at an angle of 45° with respect to the plane of polarization of the incident beam L (azimuth 45°). Accordingly, the beam reflected back from the beam-splitting film 36 (the reference beam), which only traverses the plate QWP1, emerges with its polarization unchanged. However, the beam transmitted by the beamsplitting film 36 (the object beam), which traverses the plate QWP2 twice, emerges with its plane of polarization rotated by 90°. Since the plates QWP1 and QWP2 are cut from a single achromatic $\lambda/4$ plate, both beams traverse the same thicknesses of the birefringent materials used for the $\lambda/4$ plates and dispersion effects are cancelled.

Since the test and reference beams, T' and R', emerging from the Mirau interferometer of FIG. 8 are polarized in orthogonal planes, a system operating on the geometric (Pancharatnam) phase can be placed in the output beams, as shown in the figure, and used as an achromatic phase-shifter. The simplest system could be a quarter-wave plate 38 positioned with its principal plane at 45° with respect to the planes of polarization of the output beams, followed by a rotatable linear polarizer 40. Rotation of the polarizer 40 through an angle $\theta$ introduces a phase difference of $2\theta$ between the two beams, as required for phase shifting. The output of the achromatic phase-shifter is then recorded by a camera 42 and processed in conventional manner.

Figure 9:
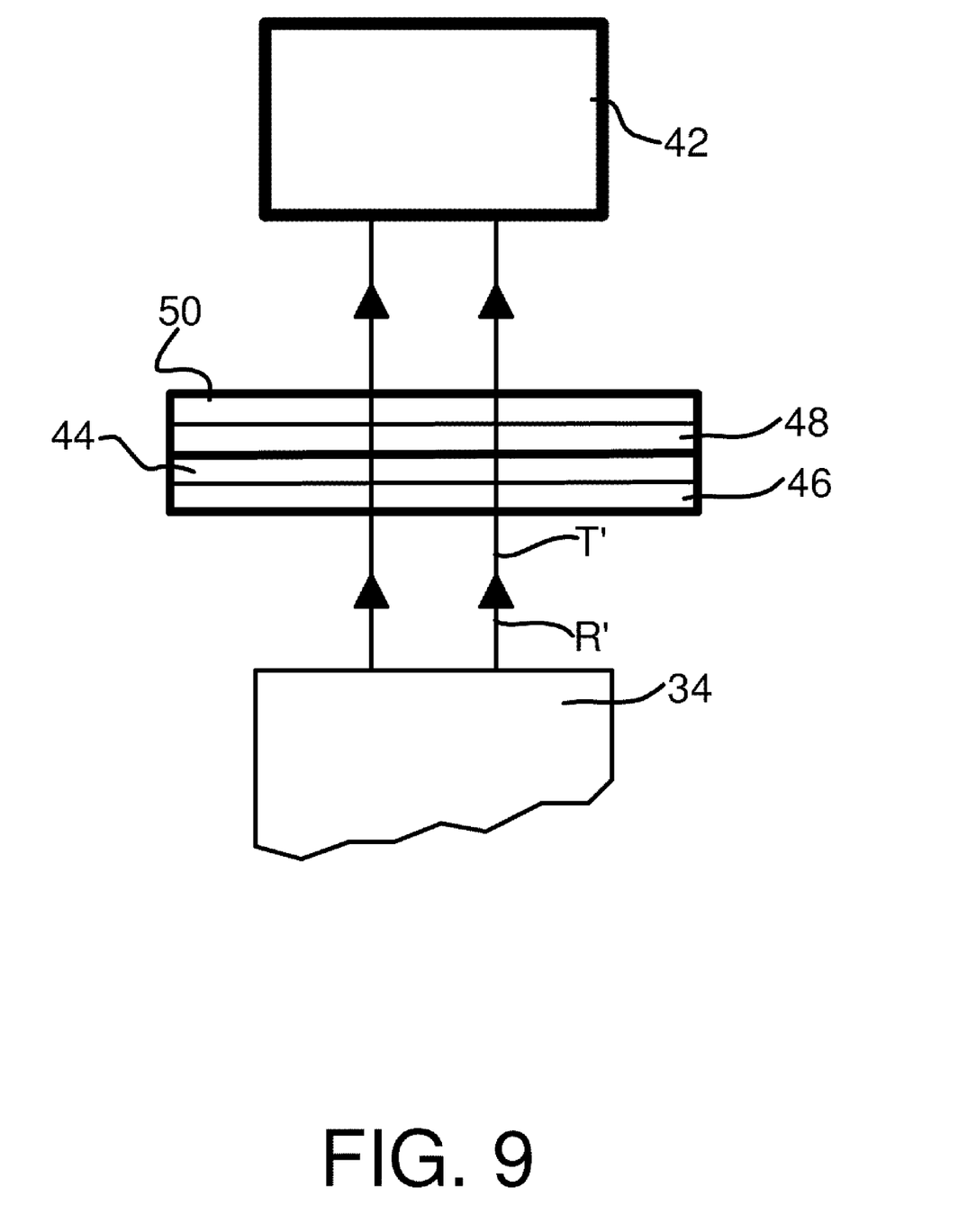
FIG. 9 illustrates an alternative achromatic phase shifter for the polarization Mirau interferometer of the invention.
Figure 10:
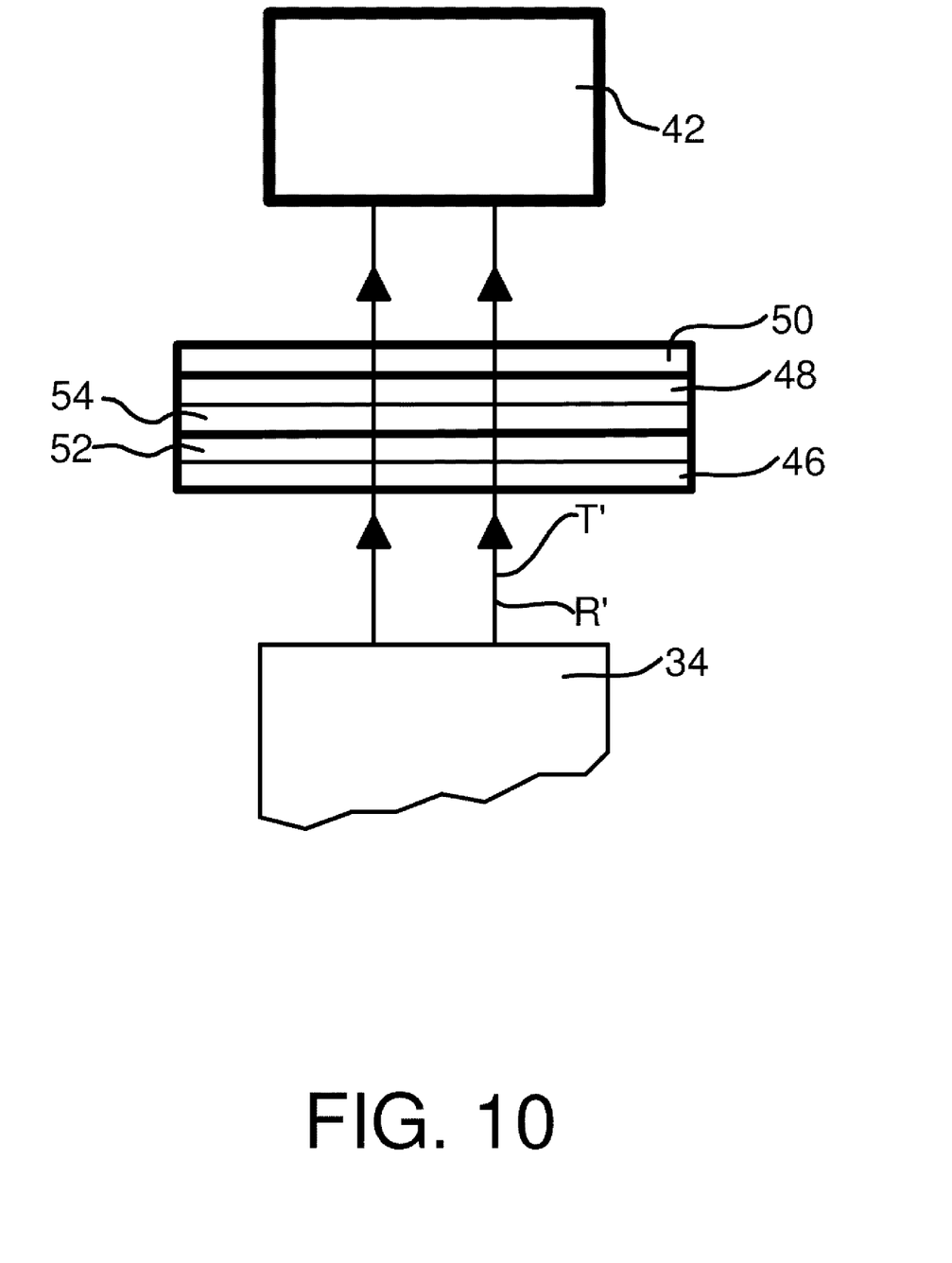
FIG. 10 illustrates yet another achromatic phase shifter suitable for use with the polarization Mirau interferometer of the invention.

Alternatively, it is possible to use a half-wave plate 44 mounted between two quarter-wave plates 46,48 set at 45° with respect to the planes of polarization of the output beams, followed by a rotatable linear polarizer 50, as illustrated in the partial view of FIG. 9. Rotation of the $\lambda/2$ plate 44 through an angle $\theta$ introduces a phase difference of $4\theta$ between the two beams. The $\lambda/2$ plate 44 in this arrangement could be replaced by two ferroelectric liquid-crystal cells 52,54 with a retardation of $\lambda/2$ to obtain a fast, switchable achromatic phase-shifter, as illustrated in FIG. 10.

The fact that the two beams T',R' emerging from the Mirau interferometer are polarized in orthogonal planes also opens up other possibilities. Instead of collecting time-sequential multiple phase-shifted frames at each axial position of the objective, a set of spatially separated phase-shifted images can be collected simultaneously by employing a diffraction grating and polarization optics. See A. Hettwer, J. Kranz and J. Schwider, "Three channel phase-shifting interferometer using polarization optics and diffraction grating," Opt. Eng. 39(40), 960-966, (2000).

Alternatively, a camera with a pixelated phase mask, using spatially distributed arrays of polarizers, can be employed to acquire a set of phase-shifted images simultaneously, as illustrated in FIG. 7. See J. Millerd, N. Brock, J. Hayes, M. North-Morris, M. Novak, and J. Wyant, "Pixelated phase-mask dynamic interferometer," in Interferometry XII: Techniques and Analysis, K. Creath and J. Schmit, eds., Proc. SPIE 5531, 304-314 (2004).

Finally, if the beamsplitter (QWP2 in FIG. 8), the reference mirror, the whole objective, or the sample is mounted on a PZT, measurements can also be made with the Mirau objective of the invention using conventional phase-shifting techniques. The advantage of this arrangement over the conventional Mirau interference microscope setup is that in this mode it is possible to equalize the amplitudes of the two beams (for example, when making measurements on a sample with a low reflectance) by removing the geometric phase shifter placed in the output beams and replacing it with a rotatable linear polarizer.

Figure 11:
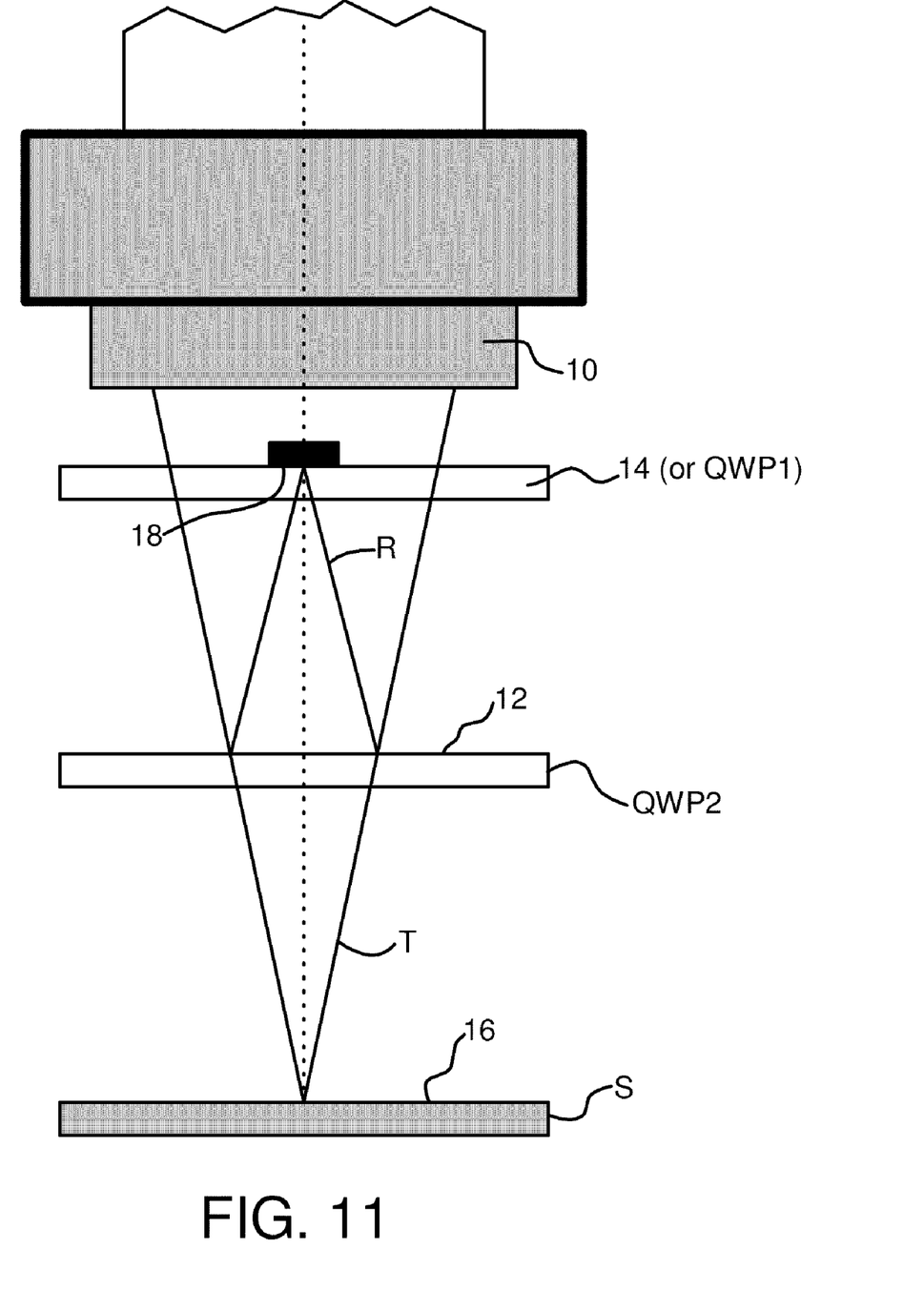
FIG. 11 illustrates a polarization Mirau interferometer according to an alternative embodiment of the invention.

Note that the invention may be practiced as well with reference to the Mirau configuration of FIG. 1B. In such case, as illustrated in FIG. 11, the two plates 14 and 14' are replaced either by two identical retarders (such as quarter-wave plates QWP1 and QWP2, respectively), or by a single retarder (QWP2) in the test arm of the interferometer. Of course, a beamsplitting element, such as a coating 12 over the quarter-wave plate QWP2, is needed to complete the Mirau interferometer structure.

Figure 12:
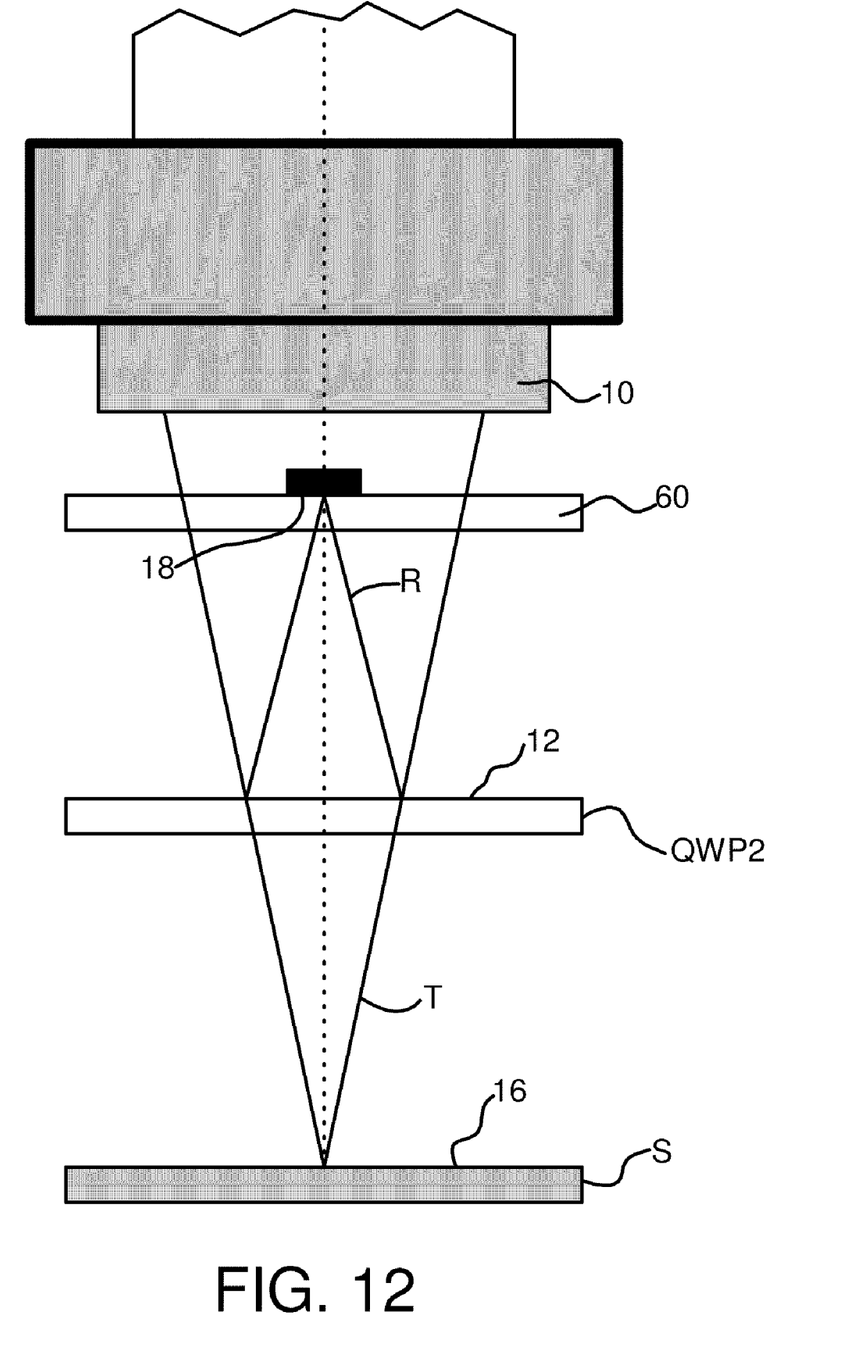
FIG. 12 illustrates a polarization Mirau interferometer according to a less preferred embodiment of the invention.

FIG. 12 illustrates a refined embodiment when a single quarter-wave retarder is used in the test arm. In order to optimize compensation for dispersive effects, the reference arm plate 60 is made of a different thickness than that of QWP2, as needed. The goal is to provide a plate 60 that matches the dispersive effects of the quarter-wave retarder used in the test arm of the interferometer to introduce the 90-degree rotation in the incident polarized light needed to practice the invention.

Thus, an improved Mirau interferometer that produces orthogonally polarized output beams has been disclosed. Orthogonally polarized output beams advantageously allow for the introduction of temporal achromatic phase shifts, spatial splitting of interferograms for instantaneous achromatic phase shifting, and equalization of beam intensities for better fringe contrast.

While the invention has been shown and described herein with reference to what is believed to be the most practical embodiment, it is recognized that departures can be made within the scope of the invention. For example, the invention has been described in terms of quarter-wave plates, but any other form of retarder suitable for incorporation into a Mirau structure could be used practice the invention. For example, QWP and HWP can be produced with different technologies, such as quarts, electronically controlled liquid crystals (for which no mechanical rotation is required), Pockels cells, etc. Similarly, as mentioned above, those skilled in the art will readily recognize that the Mirau configuration of the invention could also be used advantageously for equalization of beams intensity by placing a rotatable polarizer at the exit of the interferometer. Therefore, the invention is not to be limited to the details disclosed herein but is to be accorded the full scope of equivalent articles.

We claim:

1. In a Mirau interferometer including a source of linearly polarized illumination of a predetermined bandwidth and a predetermined plane of polarization, wherein said illumination is directed toward a test surface and a totally reflective reference mirror that obscures a portion of test and reference beams directed toward a detector, the improvement comprising:
    a beamsplitting element splitting said linearly polarized illumination into linearly polarized test and reference beams;
    an achromatic quarter-wave retarder placed in an optical path of the test beam; and
    an optical element in an optical path of said test and reference beams directed toward said totally reflective reference mirror, said optical element having dispersive characteristics matching said quarter-wave retarder at said predetermined bandwidth of the linearly polarized illumination;
    wherein the retarder is set with a principal axis at a 45-degree angle with respect to the plane of polarization of the linearly polarized illumination, so as to produce orthogonally polarized test and reference output beams.

2. The Mirau interferometer of claim 1, wherein said optical element is another quarter-wave retarder identical to said quarter-wave retarder but placed with a principal axis parallel to the plane of polarization of the linearly polarized illumination.

3. The Mirau interferometer of claim 2, wherein said retarders are quarter-wave plates.

4. The Mirau interferometer of claim 1, further including a geometric phase shifter optically coupled to said orthogonally polarized test and reference output beams produced by the interferometer.

5. The Mirau interferometer of claim 4, wherein said geometric phase shifter comprises a quarter-wave plate positioned with a principal plane at a 45-degree angle with respect to planes of polarization of said output beams, followed by a rotatable linear polarizer.

6. The Mirau interferometer of claim 4, wherein said geometric phase shifter comprises a half-wave plate mounted between two quarter-wave plates set at 45-degree angle with respect to planes of polarization of said output beams, followed by a rotatable linear polarizer.

7. A Mirau interferometer comprising:
    a source of linearly polarized illumination of predetermined bandwidth having a predetermined plane of polarization, said illumination being directed toward a test surface and a totally reflective reference mirror that obscures a portion of test and reference beams directed toward a detector;
    a beamsplitting element splitting said linearly polarized illumination into linearly polarized test and reference beams;
    an achromatic quarter-wave retarder placed in an optical path of the test beam; and
    an optical element in an optical path of said test and reference beams directed toward said totally reflective reference mirror, said optical element having dispersive characteristics matching said quarter-wave retarder at said predetermined bandwidth of illumination;
    wherein the retarder is set with a principal axis at a 45-degree angle with respect to the plane of polarization of the linearly polarized illumination, so as to produce orthogonally polarized test and reference output beams.

8. The Mirau interferometer of claim 7, wherein said optical element is another quarter-wave retarder identical to said quarter-wave retarder but placed with a principal axis parallel to the plane of polarization of the linearly polarized illumination.

9. The Mirau interferometer of claim 8, wherein said retarders are quarter-wave plates.

10. The Mirau interferometer of claim 7, further including a geometric phase shifter optically coupled to said orthogonally polarized test and reference output beams produced by the interferometer.

11. The Mirau interferometer of claim 10, wherein said geometric phase shifter comprises a quarter-wave plate positioned with a principal plane at a 45-degree angle with respect to planes of polarization of said output beams, followed by a rotatable linear polarizer.

12. The Mirau interferometer of claim 10, wherein said geometric phase shifter comprises a half-wave plate mounted between two quarter-wave plates set at 45-degree angle with respect to planes of polarization of said output beams, followed by a rotatable linear polarizer.

13. A Mirau interferometer comprising:
    a light source producing an illumination beam of predetermined wavelength directed toward a test surface and a totally reflective reference mirror that obscures a portion of test and reference beams directed toward a detector;
    a polarizer producing a linearly polarized beam with a predetermined plane of polarization from said illumination beam;

a first achromatic quarter-wave plate placed in an optical path of the test beam with a principal axis at a 45-degree angle with respect to said predetermined plane of polarization of the linearly polarized beam;
a beamsplitting coating on said first achromatic quarter-wave plate splitting said linearly polarized illumination into linearly polarized test and reference beams;
a second achromatic quarter-wave plate placed in an optical path of the reference beam with a principal axis parallel to said predetermined plane of polarization of the linearly polarized beam, said first and second achromatic quarter-wave plates being cut from a single quarter-wave plate,
wherein said polarizer, first achromatic quarter-wave plate, beamsplitting coating, and second achromatic quarter-wave plate are combined such that orthogonally polarized test and reference output beams are produced by the interferometer.

14. A method for producing orthogonally polarized beams in an output of a Mirau interferometer including a source of linearly polarized illumination of predetermined bandwidth and predetermined plane of polarization directed toward a test surface and a totally reflective reference mirror that obscures a portion of test and reference beams directed toward a detector, the method comprising the following steps:
splitting the linearly polarized illumination into linearly polarized test and reference beams;
retarding the test beam by a quarter-wave length, thereby producing orthogonally polarized output beams; and
placing an optical element in an optical path of the reference beam so as to match dispersive effects affecting the test beam at said predetermined bandwidth of the linearly polarized illumination.

15. The method of claim 14, wherein said retarding step is accomplished with a quarter-wave retarder and said optical element is another quarter-wave retarder identical to said quarter-wave retarder but placed with a principal axis parallel to the plane of polarization of the linearly polarized illumination.

16. The method of claim 15, wherein said retarders are quarter-wave plates.

17. The method of claim 14, further including the step of optically coupling said orthogonally polarized output beams to a geometric phase shifter.

18. The method of claim 17, wherein said geometric phase shifter comprises a quarter-wave plate positioned with a principal plane at a 45-degree angle with respect to planes of polarization of said output beams, followed by a rotatable linear polarizer.

19. The method of claim 17, wherein said geometric phase shifter comprises a half-wave plate mounted between two quarter-wave plates set at 45-degree angle with respect to planes of polarization of said output beams, followed by a rotatable linear polarizer.

* * * * *